United States Patent
Belani et al.

(10) Patent No.: US 9,262,629 B2
(45) Date of Patent: *Feb. 16, 2016

(54) METHODS AND SYSTEMS FOR PREVENTING MALICIOUS USE OF PHISHING SIMULATION RECORDS

(71) Applicant: PhishMe, Inc., Chantilly, VA (US)

(72) Inventors: Rohyt Belani, New York, NY (US);
Aaron Higbee, Leesburg, VA (US);
Scott Greaux, Glenmont, NY (US)

(73) Assignee: PhishMe, Inc., Leesburg, VA (US)

( * ) Notice: Subject to any disclaimer, the term of this patent is extended or adjusted under 35 U.S.C. 154(b) by 109 days.

This patent is subject to a terminal disclaimer.

(21) Appl. No.: 14/160,443

(22) Filed: Jan. 21, 2014

(65) Prior Publication Data
US 2015/0205953 A1    Jul. 23, 2015

(51) Int. Cl.
G06F 11/00 (2006.01)
G06F 21/55 (2013.01)
H04L 29/06 (2006.01)

(52) U.S. Cl.
CPC ............ *G06F 21/55* (2013.01); *H04L 63/1483* (2013.01)

(58) Field of Classification Search
CPC ............................. G06F 21/60; H04L 63/1483
USPC .......................................................... 726/25
See application file for complete search history.

(56) References Cited

U.S. PATENT DOCUMENTS

| | | | |
|---|---|---|---|
| 5,892,903 | A | 4/1999 | Klaus |
| 6,954,858 | B1 | 10/2005 | Welborn et al. |
| 7,281,031 | B1 | 10/2007 | Wang et al. |
| 7,325,252 | B2 | 1/2008 | Bunker, V et al. |
| 7,373,385 | B2 | 5/2008 | Prakash |
| 7,457,823 | B2 | 11/2008 | Shraim et al. |
| 7,490,356 | B2 | 2/2009 | Lieblich et al. |

(Continued)

FOREIGN PATENT DOCUMENTS

| | | |
|---|---|---|
| JP | 2006-285844 A | 10/2006 |
| JP | 2007-323640 A | 12/2007 |

(Continued)

OTHER PUBLICATIONS

Kumaraguru, et al; School of Phish: A Real-World Evaluation of Anti-Phishing Training; Symposium on Usable Privacy and Security (SOUPS) 2009, Jul. 15-17, 2009; Mountain View, CA;12 pages.

(Continued)

*Primary Examiner* — Samson Lemma
(74) *Attorney, Agent, or Firm* — CipherLaw

(57) ABSTRACT

Described herein are methods, network devices and machine-readable media for preventing the malicious use of phishing simulation records. Phishing simulation records often times can reveal which individuals are most susceptible to phishing attacks. In the event that an attacker gains access to these records, the attacker can exploit such information to send phishing attacks to those individuals who are the most susceptible. To address such vulnerabilities, a phishing simulation record of an individual is only associated with an e-mail alias of the individual. Further, such e-mail alias may be deactivated after phishing simulations have been completed. Therefore, even if an attacker were able to identify individuals most susceptible to phishing attacks, the attacker will be unable to send any phishing attacks to those individuals since their e-mail aliases will have been deactivated.

17 Claims, 5 Drawing Sheets

(56) References Cited

U.S. PATENT DOCUMENTS

| | | | |
|---|---|---|---|
| 7,509,675 B2 | 3/2009 | Aaron | |
| 7,603,709 B2 | 10/2009 | Lewis et al. | |
| 7,617,532 B1 | 11/2009 | Alexander et al. | |
| 7,634,810 B2 | 12/2009 | Goodman et al. | |
| 7,668,921 B2 | 2/2010 | Proux et al. | |
| 7,681,234 B2 | 3/2010 | Florencio et al. | |
| 7,685,631 B1 | 3/2010 | Paya et al. | |
| 7,788,723 B2 | 8/2010 | Huddleston | |
| 7,841,003 B1 | 11/2010 | Emdee | |
| 7,865,958 B2 | 1/2011 | Lieblich et al. | |
| 7,904,518 B2 | 3/2011 | Marino et al. | |
| 7,925,883 B2 | 4/2011 | Florencio et al. | |
| 7,971,246 B1 | 6/2011 | Emigh et al. | |
| 7,987,495 B2 | 7/2011 | Maler et al. | |
| 8,181,232 B2 | 5/2012 | Grandcolas et al. | |
| 8,191,148 B2 | 5/2012 | Oliver et al. | |
| 8,209,381 B2 | 6/2012 | Sinn et al. | |
| 8,220,047 B1 | 7/2012 | Soghoian et al. | |
| 8,271,007 B2 | 9/2012 | Cai et al. | |
| 8,286,249 B2 | 10/2012 | Adelstein et al. | |
| 8,291,065 B2 | 10/2012 | Goodman et al. | |
| 8,296,376 B2 | 10/2012 | Goldberg et al. | |
| 8,321,934 B1 | 11/2012 | Cooley et al. | |
| 8,327,421 B2* | 12/2012 | Ting | H04L 9/3231 713/186 |
| 8,332,918 B2 | 12/2012 | Vedula et al. | |
| 8,365,246 B2 | 1/2013 | Readshaw | |
| 8,381,293 B2 | 2/2013 | Emigh et al. | |
| 8,407,798 B1 | 3/2013 | Lotem et al. | |
| 8,423,483 B2 | 4/2013 | Sadeh-Koniecpol et al. | |
| 8,438,642 B2 | 5/2013 | Feng et al. | |
| 8,464,346 B2 | 6/2013 | Barai et al. | |
| 8,464,352 B2 | 6/2013 | Toomey | |
| 8,468,244 B2 | 6/2013 | Redlich et al. | |
| 8,484,741 B1 | 7/2013 | Chapman | |
| 8,615,807 B1* | 12/2013 | Higbee et al. | 726/25 |
| 8,635,703 B1* | 1/2014 | Belani et al. | 726/25 |
| 8,719,940 B1 | 5/2014 | Higbee et al. | |
| 8,910,287 B1 | 12/2014 | Belani et al. | |
| 8,966,637 B2 | 2/2015 | Belani et al. | |
| 9,177,314 B2* | 11/2015 | Uzo | G06Q 20/40 |
| 2002/0091940 A1 | 7/2002 | Welborn et al. | |
| 2005/0132225 A1 | 6/2005 | Gearhart | |
| 2005/0183143 A1 | 8/2005 | Anderholm et al. | |
| 2006/0075504 A1 | 4/2006 | Liu | |
| 2006/0123464 A1 | 6/2006 | Goodman et al. | |
| 2006/0168066 A1 | 7/2006 | Helsper et al. | |
| 2006/0174119 A1 | 8/2006 | Xu | |
| 2006/0271631 A1 | 11/2006 | Qureshi et al. | |
| 2007/0107053 A1 | 5/2007 | Shraim et al. | |
| 2007/0136806 A1 | 6/2007 | Berman | |
| 2007/0192855 A1 | 8/2007 | Hulten et al. | |
| 2007/0245422 A1 | 10/2007 | Hwang et al. | |
| 2007/0250618 A1 | 10/2007 | Hammond | |
| 2007/0294352 A1 | 12/2007 | Shraim et al. | |
| 2008/0037583 A1* | 2/2008 | Dawes | G06Q 10/06 370/467 |
| 2008/0037791 A1 | 2/2008 | Jakobsson | |
| 2008/0040274 A1* | 2/2008 | Uzo | G06Q 20/40 705/44 |
| 2008/0047017 A1 | 2/2008 | Renaud | |
| 2008/0052359 A1 | 2/2008 | Golan et al. | |
| 2008/0141342 A1 | 6/2008 | Curnyn | |
| 2008/0184349 A1* | 7/2008 | Ting | H04L 9/3231 726/7 |
| 2008/0271124 A1 | 10/2008 | Nisbet et al. | |
| 2008/0288303 A1 | 11/2008 | Gray et al. | |
| 2008/0288330 A1 | 11/2008 | Hildebrand et al. | |
| 2009/0013041 A1 | 1/2009 | Farmer et al. | |
| 2009/0089859 A1 | 4/2009 | Cook et al. | |
| 2009/0144308 A1 | 6/2009 | Huie et al. | |
| 2009/0172772 A1 | 7/2009 | Souille | |
| 2009/0241168 A1 | 9/2009 | Readshaw | |
| 2009/0241173 A1 | 9/2009 | Troyansky | |
| 2009/0259725 A1 | 10/2009 | Rabinovich | |
| 2009/0265430 A1 | 10/2009 | Bechtel et al. | |
| 2009/0282112 A1 | 11/2009 | Prakash | |
| 2009/0319647 A1 | 12/2009 | White et al. | |
| 2009/0320137 A1 | 12/2009 | White et al. | |
| 2009/0328208 A1 | 12/2009 | Peters | |
| 2010/0017616 A1 | 1/2010 | Nichols et al. | |
| 2010/0043071 A1 | 2/2010 | Wang | |
| 2010/0125911 A1 | 5/2010 | Bhaskaran | |
| 2010/0138925 A1 | 6/2010 | Barai et al. | |
| 2010/0154055 A1 | 6/2010 | Hansen | |
| 2010/0205014 A1* | 8/2010 | Sholer | G06Q 40/08 705/4 |
| 2010/0211641 A1 | 8/2010 | Yih et al. | |
| 2010/0235918 A1 | 9/2010 | Mizrahi et al. | |
| 2010/0281536 A1 | 11/2010 | Richards et al. | |
| 2010/0299292 A1 | 11/2010 | Collazo | |
| 2010/0313266 A1 | 12/2010 | Feng et al. | |
| 2011/0030059 A1 | 2/2011 | Greenwald | |
| 2011/0055922 A1 | 3/2011 | Cohen et al. | |
| 2011/0061089 A1 | 3/2011 | O'Sullivan et al. | |
| 2011/0072262 A1 | 3/2011 | Amir et al. | |
| 2011/0078795 A1 | 3/2011 | Liu | |
| 2011/0093546 A1 | 4/2011 | Rubingh | |
| 2011/0184877 A1 | 7/2011 | McHugh et al. | |
| 2011/0225652 A1 | 9/2011 | Emigh et al. | |
| 2011/0238855 A1 | 9/2011 | Korsunsky et al. | |
| 2012/0096553 A1 | 4/2012 | Srivastava et al. | |
| 2012/0124671 A1* | 5/2012 | Fritzson et al. | 726/26 |
| 2012/0174235 A1 | 7/2012 | Hamilton, II et al. | |
| 2012/0258437 A1 | 10/2012 | Sadeh-Koniecpol et al. | |
| 2012/0311669 A1 | 12/2012 | Akase | |
| 2012/0311703 A1 | 12/2012 | Yanovsky et al. | |
| 2012/0324576 A1 | 12/2012 | Clark et al. | |
| 2013/0018972 A1 | 1/2013 | Sargent et al. | |
| 2013/0031627 A1 | 1/2013 | Wang et al. | |
| 2013/0198846 A1* | 8/2013 | Chapman | 726/25 |
| 2013/0203023 A1* | 8/2013 | Sadeh-Koniecpol et al. | 434/118 |
| 2013/0268470 A1 | 10/2013 | Yablokov et al. | |

FOREIGN PATENT DOCUMENTS

| | | |
|---|---|---|
| WO | 2011/017196 A2 | 2/2011 |
| WO | 2012/068255 A2 | 5/2012 |

OTHER PUBLICATIONS

K. Jansson and R. von Solms, "Social Engineering: Towards a Holistic Solution," presented at the South African Information Security Multi-Conference, Port Elizabeth, South Africa, 2010.

"WhiteGold goes fishing for phishing", www.arnnet.com.au/article/299134/whitegold_goes_fishing_phishing/, accessed Jul. 23, 2013, Apr. 14, 2009, 3 pages.

"United States Military Academies to Use PhishMe to Combat Spear Phishing", msmvps.com/blogs/donna/archive/2009/07/24/united-states-military-academies-to-use-phishme-to-combat-spear-phishing.aspx, accessed Jul. 24, 2013, Jul. 24, 2009, 1 pg.

Brian M. Bowen et al., "Measuring the Human Factor of Cyber Security", Department of Computer Science Columbia University, 2011, 6 pages.

"What is PhishMe?", accessed at http://web.archive.org/web/20111104184530/http://www.phishme.com/what_is_phishme.php on May 9, 2015, 2 pgs., (Nov. 4, 2011).

Images from PhishMe Shockwave Animation (2008), 4 pages.

Jansson, Kenny, "A Model for Cultivating Resistance to Social Engineering Attacks", Dissertation, Sep. 2011, with attachments.

"Anti-phishing training adds attachments to mix", www.networkworld.com/news/2009/090209-anti-phishing-training-adds-attachments-to.html, accessed Sep. 9, 2013, 2009, 3 pages.

"Core Impact penetration tester goes phishing", InfoWorld, Jan. 7, 2008, 2 pages.

"Core Impact 7.5", www.infoworld.com/print/31390, SC Magazine, Aug. 2008, 1 page.

Victor Garza, "Product review: Core Impact penetration tester goes phishing", www.infoworld.com/print/31390, accessed Sep. 9, 2013, 2008, 3 pages.

(56) References Cited

OTHER PUBLICATIONS

Markus Jakobsson et al., "Designing Ethical Phishing Experiments: A study of (ROT13) rOnl query features", Indiana University, Bloomington, IN 47406, USA, WWW 2006, May 23-26, 2006, Edinburgh, Scotland, ACM 1595933239/06/0005., 10 pages.

"To defeat phishing, Energy learns to phish", gcn.com/Articles/2011/06/13/DOE-Phishing-Test.aspx?p=1, accessed Sep. 9, 2013, 2011, 3 pages.

"Humans are the Front Line' against Phishing for Intrepidus Group", blog.executivebiz.com/2010/03/humans-are-the-front-line-against-phishing-for-intrepidus-group/, accessed Sep. 9, 2013, 2010, 3 pages.

"InfoSec: 23 percent of users fall for spear phishing", www.scmagazine.com/infosec-23-percent-of-users-fall-for-spear-phishing/article/128480/#, accessed Sep. 9, 2013, 2009, 3 pages.

"Intrepidus Group and BrandProtect Partner to Offer Holistic Anti-Phishing Solution", www.redorbit.com/news/technology/1670312/intrepidus_group_and_brandprotect_partner_to_offer_holistic_antiphishing_solution/, accessed Sep. 9, 2013, 2009, 3 pages.

Ponnurangam Kumaraguru, "PhishGuru: A System for Educating Users about Semantic Attacks", 2009 dissertation, School of Computer Science, Institute for Software Research, Carnegie Mellon University, Pittsburgh, PA 15213, 198 pages.

"Phishing for user security awareness" Dodge, Ronald C.; Carver, Curtis; Ferguson, Aaron J. Computers & Security, vol. 26 (1), Elsevier, Feb. 1, 2007, 8 pages.

"One-Quarter of Worldwide Population at Risk of Spear Phishing Attacks", www.certmag.com/read.php?in=5245, accessed Sep. 9, 2013, 2 pages.

Thomas Claburn, "Phish Your Colleagues With PhishMe", www.informationweek.com/security/client/phish-your-colleagues-with-phishme/209400255, accessed Sep. 9, 2013, Jul. 22, 2008, 2 pages.

K. Jansson and R. von Solms, "Phishing for phishing awareness", 2011-2013, 18 pages.

"PhishMe.com Overview", 2010.

"Phishme.com Internal Communication", ha.ckers.org/blog/20080306/phishmecom-internal-communication/, accessed Sep. 9, 2013, 5 pages.

Phishme,com, "Introduction to PhishMe.com", Nov. 2010, 15 pages.

K. Jansson and R. von Solms, "Phishing for phishing awareness," Behaviour & Information Technology, pp. 1-10, 2011.

Lori Faith Cranor, "Can Phishing Be Foiled?", Scientific American, Dec. 2008, 7 pages.

"Social Phishing" Tom N. Jagatic, Nathaniel A. Johnson, Markus Jakobsson, Filippo Menczer Communications of the ACM, vol. 50 No. 10, pp. 94-100, Oct. 2007.

"Reduce the risk from targeted phishing and malware attacks. On demand.", Stratum Security, 2011, 2 pages.

"ThreatSim: Executive Summary", Stratum Security, 2011, 6 pages.

K. Jansson and R. von Solms, "Towards a Social Engineering Resistant User Model," presented at 13th Annual Conference on WWW Applications, Johannesburg, South Africa (2011).

"An Empirical Evaluation of PhishGuruTM Embedded Training" Wombat Security Technologies, Apr. 2009, 12 pages.

"What is PhishMe?", Interpidus Group, 2009, 1 page.

Rohyt Belani, "Spear Phishing Train Your Workforce to Dodge the Hook" 2009, 26 pages.

"Phishme.com Internal Communication", ha.ckers.org web application security lab, Mar. 6, 2008, 5 pgs.

"How PhishMe Works", accessed at http://web.archive.org/web/20111204012721/http://phishme.com/how_phishme_works_php on May 9, 2015, 2 pgs. (Dec. 4, 2011).

How to Create a Self-Signed Digital Certificate in Microsoft Office 2010, Nov. 20, 2010.

Building an encrypted and searchable audit log, 11th Annual Network and Distributed Security Symposium (NDSS '04), Feb. 5-6, 2004.

Automatically Encrypting all Incoming Email; Jan. 13, 2011.

Alnajim, Abdullah, et al., "An Anti-Phishing Approach that Uses Training Intervention for Phishing Websites Detection," 2009 Sixth International Conference on Information Technology: New Generations, 2009, DD. 405-410, IEEE, USA.

Toolan, Fergus, et al., "Feature Selection for Spam and Phishing Detection," 2010 eCrime Researchers Summit, 2010, pp. 1-12, IEEE, USA.

Fette, Ian, et al., "Learning to Detect Phishing Emails," Carnegie Mellon Cyber Laboratory Technical Report CMU-CYLAB-06-012, Jun. 2006, pp. 1-12, Carnegie Mellon University, PA, USA.

Soni, Pravin, et al., "A Phishing Analysis of Web Based Systems," ICCCS'11Feb. 12-14, 2011, Rourke/a, Odisha, India, 2011, pp. 527-530, ACM, USA.

Alnajim, A., et al., "An Approach to the Implementation of the Anti-Phishing Tool for Phishing Websites Detection," International Conference on Intelligent Networking and Collaborative Systems, 2009, p. 105-112, IEEE, USA.

He, Mingxing, et al., "An efficient phishing webpage detector," Expert Systems with Applications, 2011, pp. 12018-12027, vol. 38, Elsevier Ltd., UK.

Zhang, Yue, et al., "CANTINA: A Content-Based Approach to Detecting Phishing Web Sites," Proceedings of the 16th International Conference on World Wide Web, May 8-12, 2007, Banff, Alberta, Canada, May 2007, pp. 639-648, ACM, USA.

Wenyin, Liu, et al., "Detection of Phishing Webpages based on Visual Similarity," 14th International Conference on World Wide Web, May 10-14, 2005, Chiba, Japan, DD. 1060-1061, ACM, USA.

Parno, Bryan, et al., "Phoolproof Phishing Prevention," CyLab Carnegie Mellon University, Dec. 3, 2005, 16 pages, Carnegie Mellon University, PA, USA.

Dhamija, Rachna, et al., "The Battle Against Phishing: Dynamic Security Skins," Symposium on Usable Privacy and Security (SOUPS) 2005, Jul. 6-8, 2005, Pittsburgh, PA, USA, 12 pages.

Huang, Chun-Ying, et al., "Using one-time passwords to prevent password phishing attacks," Journal of Network and Computer Applications, 2011, DD. 1-10, Elsevier B.V., NL.

Jackson, Collin, et al., "An Evaluation of Extended Validation and Picture-in-Picture Phishing Attacks," Financial Cryptography and Data Security, 2007, 13 pages, Springer-Verlag, DE.

Kang, Le, et al., "CAPTCHA Phishing: A Practical Attack on Human Interaction Proofing," Inscrypt 2009, LNCS 6151, 2010, pp. 411-425, Springer-Verlag, DE.

Dazeley, Richard, et al, "Consensus Clustering and Supervised Classification for Profiling Phishing Emails in Internet Commerce Security," PKAW 2010, LNAI 6232, 2010, pp. 235-246, Springer-Verlag, DE.

Jakobsson, Markus, "Modeling and Preventing Phishing Attacks," FC'05 Proceedings of the 9th international conference on Financial Cryptography and Data Security, 2005, pp. 1-19.

Dhamija, Rachna, et al., "Why Phishing Works," Proceeding ofCHI-2006: Conference on Human Factors in Computing Systems, Apr. 2006, 10 pages.

Wu, Min, et al., "Do Security Toolbars Actually Prevent Phishing Attacks?," CHI 2006, Apr. 22-27, 2006, Montreal, Quebec, Canada, 2006, 10 pages, ACM, USA.

Zhang, Yue, et al., "Phinding Phish: Evaluating Anti-Phishing Tools," Proceedings of the 14th Annual Network and Distributed System Security Symposium (NOSS 2007), 2007, 16 pages.

Egelman, Serge, et al., "You've Been Warned: An Empirical Study of the Effectiveness of Web Browser Phishing Warnings," CHI 2008, Apr. 5-10, 2008, Florence, Italy, 2008, 10 pages, ACM, USA.

Downs, Julie, et al., "Decision Strategies and Susceptibility to Phishing," Symposium on Usable Privacy and Security (SOUPS), Jul. 12-14, 2006, Pittsburgh, PA, USA, 2006, 12 pages.

Wright, Ryan, et al., "The Influence of Experiential and Dispositional Factors in Phishing: An Empirical Investigation of the Deceived," Journal of Management Information Systems, Summer 2010, IPP. 273-303, vol. 27, No. 1, M.E. Sharpe, Inc., USA.

Sheng, Steve, et al., "Who Falls for Phish? A Demographic Analysis of Phishing Susceptibility and Effectiveness of Interventions," CHI 2010, Apr. 10-15, 2010, Atlanta, Georgia, USA, 2010, 10 pages, ACM, USA.

Vishwanath, Arun, et al., "Why do people get phished? Testing individual difference in phishing vulnerability within an integrated,

(56) References Cited

OTHER PUBLICATIONS information processing model," Decision Support Systems, 2011, IDD. 576-586, vol. 51, Elsevier B.V., NL.
Alnajim, Abdullah, et al., "An Evaluation of Users' Anti-Phishing Knowledge Retention," 2009 International Conference on Information Management and Engineering, 2009, pp. 210-214, IEEE, USA.
Sheng, Steve, et al., "Anti-Phishing Phil: The Design and Evaluation of a Game That Teaches People Not to Fall for Phish," Symposium on Usable Privacy and Security (SOUPS) 2007, Jul. 18-20, 2007, Pittsburgh, PA, USA, 2007, 12 pages.
Kumaraguru, Ponnurangam, et al., "Protecting People from Phishing: The Design and Evaluation of an Embedded Training Email System," Proceeding of the SIGCHI Conference on Human Factors in Computing Systems, Apr. 2007, pp. 1-10, ACM, USA.
Blom, Elma, et al., "Dummy auxiliaries in child and adult second language acquisition of Dutch," Lingua, 2011, pp. 906-919, vol. 121, Elsevier B.V., NL.
Radford, Andrew, et al., "On the Acquisition of Universal and Parameterised Goal Accessibility Constraints by Japanese Learners of English," Essex Research Reports in Linguistics, Mar. 2011, 46 pages (cover and second page, and DD. 1-44), vol. 60, No. 5, University of Essex, UK.
Dominiguez, Laura, et al., "Testing the Predictions of the Feature Assembly Hypothesis Evidence from the L2 Acquisition of Spanish Aspect Morphology," Proceedings of the Boston University Conference on Language Development, 2011, 14 pages, vol. 35, Cascadilla Press, MA, USA.
Bliton, Daniel, et al., "Unannounced Phishing Exercises and Targeted Training: Results and Lessons Learned," Interservice/Industry Training, Simulation, and Education Conference (11/TSEC), 2011, pp. 1-11, Paper No. 11342, I/ITSEC, USA.
Adams, Elizabeth, et al., "Brief Overview: Mandatory Training-A Systematic Review of Research NPL and Trends in Learning Organizations," Veterans Health Administration Office of Patient Care Services Technology Assessment Program, TAP Brief Overview, Mar. 2010, 23 pages (cover page, pp. i-iii, and pp. 1-19), VA Technology Assessment Program, Boston, MA, USA.
Ferguson, Aaron J., "Fostering E-Mail Security Awareness: The West Point Carronade," Educause Quarterly, 2005, pp. 54-57, vol. 28, No. 1, Educause Online Publication, http://www.educause.edu/eq.
Hidi, Suzanne, et al., "Strategies for increasing text-based interest and students' recall of expository texts," Reading Research Quarterly, Fall 1988, pp. 465-483, XX.111/4, International Reading Association, Delaware, USA.
Klevinsky, T. J., et al., Chapter 3—Penetration for Hire, Hack I. T.—Security Through Penetration Testing, 2002, DD. 25-27, Addison-Wesley Professional, Pearson Education Ltd, USA.
Sadoski, Mark, "Resolving the Effects of Concreteness on Interest, Comprehension, and Learning Important Ideas From Text," Educational Psychology Review, 2001, pp. 263-281, vol. 13, No. 3, Plenum Publishing Corporation, NY, USA.
Simulating malicious emails to educate end users on-demand, Jansson, Kenny; Von Solms, Rossouw, IEEE Symposium on Web Society, p. 74-80, 2011, ISSN: 21586985, E-ISSN: 21586993; ISBN-13: 9781457702112; 2011 3rd Symposium on Web Society, SWS2011, Oct. 26, 2011-Oct. 28, 2011, Institute for ICT Advancement, Nelson Mandela Metropolitan University, Port Elizabeth, South Africa.
School of phish: a real-world evaluation of anti-phishing training, Ponnurangam Kumaraguru; Justin Cranshaw; Alessandro Acquisti; Lorrie Cranor; Jason Hong; Mary Ann Blair; Theodore Pham, Carnegie Mellon University, SOUPS '09 Proceedings of the 5th Symposium on Usable Privacy and Security, Article No. 3, ISBN: 978-1-60558-736-3; doi:10.1145/1572532.1572536, 12 pages.
Design a mobile game for home computer users to prevent from "phishing attacks", Arachchilage, Nalin Asanka Garnagedara; Cole, Melissa, International Conference on Information Society, i-Society 2011, p. 485-489, 2011, ISBN-13: 9780956426383; Article No. 5978543, International Conference on Information Society, i-Society 2011, Jun. 27, 2011-Jun. 29, 2011, School of Information Systems, Computing and Mathematics, Brunel University, Uxbridge, Middlesex, United Kingdom.
Kumaraguru et al., "Lessons From a Real World Evaluation of Anti-Phishing Training", 14 pages.
Robertson, "Amid the VIPERS Establishing Malware's Position Within the Information Ecosystem", 54 pages, 2011.
Sheng et al., "Anti-Phishing Phil: The Design and Evaluation of a Game That Teaches People Not to Fall for Phish", 14 pgs, 2007.
Spinapolice, "Mitigating the Risk of Social Engineering Attacks", 67 pgs. 2011.
Trevor, "Stratum Security, Announcing ThreatSim—Stratum's Spear Phishing and Data Exfiltration SaaS Offering", 1 pg, 2013.
Alex Tsow and Markus Jakobsson, "Deceit and Deception: A Large User Study of Phishing", 46 pages, 2007.
Wombat Security Technologies, "Wombat Security Technologies Offers Tips, Training, and Free Simulated Phishing Attacks to Help Companies and their Employees Avoid Holiday Phishing Scams", 3 pages, 2011.
Steve Sheng, Mandy Holbrook, Ponnurangam Kumaraguru, Lorrie Cranor, Julie Downs, "Who Falls for Phish? A Demographic Analysis of Phishing Susceptibility and Effectiveness of Interventions" CHI 2010, Apr. 10-15, 2010, Atlanta, GA, USA, 10 pages.
"Phishme: The Easy Way to Enhance Employee Phishing Awareness", http://www.brighthub.com/computing/enterprise-security/reviews/5298.aspx; accessed Jul. 23, 2013; Jul. 4, 2011, 3 pages.
"What is PhishMe?", http://phishme.com/whatisphishme.html; accessed Jul. 23, 2013; 2 pages.
Aaron Higbee, "Phishme.com—Techincal Paper", 2009, 10 pages.
Art Fritzson et al, U.S. Appl. No. 61/414,142, filed Nov. 16, 2010, "Phishing Awareness Training (PAT) Distinction Components" 39 pages.

\* cited by examiner

US 9,262,629 B2

METHODS AND SYSTEMS FOR PREVENTING MALICIOUS USE OF PHISHING SIMULATION RECORDS

FIELD OF THE INVENTION

The present invention relates to methods, network devices and machine-readable media for preventing the malicious use of phishing simulation records, and more particularly relates to techniques for decoupling phishing simulation records from the contact information of individuals by means of an e-mail alias.

BACKGROUND

In a phishing attack, an individual (e.g., a person, an employee of a company, a user of a computing device) receives a message, commonly in the form of an e-mail or other electronic communication, directing the individual to perform an action, such as opening an e-mail attachment or following (e.g., using a cursor controlled device or touch screen) an embedded link. If such message were from a trusted source (e.g., co-worker, bank, utility company or other well-known and trusted entity), such action might carry little risk. Nevertheless, in a phishing attack, such message is from an attacker (e.g., an individual using a computing device to perform a malicious act on another computer device user) disguised as a trusted source, and an unsuspecting individual, for example, opening an attachment to view a "friend's photograph" might in fact install spyware, a virus, and/or other malware (i.e., malicious computer software) on his/her computer. Similarly, an unsuspecting individual directed to a webpage made to look like an official banking webpage might be deceived into submitting his/her username, password, banking account number, etc. to an attacker.

While there are computer programs designed to detect and block phishing e-mails, phishing attacks methods are constantly being modified by attackers to evade such forms of detection. More recently, training programs have been developed to train users to recognize phishing attacks, such training involving simulated phishing attacks. While such training is beneficial, training programs may accumulate certain information about the users, which, if exploited by an attacker (e.g., attacker were able to gain access to same), could cause great harm to the participants of the training programs. The present invention addresses such potential vulnerabilities of training programs.

SUMMARY OF THE INVENTION

The inventors have realized that training programs (e.g., providing employees of a company with simulated phishing attacks, followed by training materials), may collect certain information that could be exploited by an attacker. For example, training programs may maintain a measure of each individual's susceptibility to simulated phishing attacks. If an attacker were to gain access to such information, the attacker could specifically target those individuals determined to be highly susceptible to phishing attacks. Indeed, it would be ironic, but nevertheless detrimental, that a program designed to protect individuals from phishing attacks could be exploited by an attacker to more effectively attack the individuals.

One approach to addressing such vulnerability is to decouple any phishing simulation record of an individual from his/her personal information (e.g., name, birth date, age, gender, etc.) and/or contact information (e.g., mailing address, telephone number, mobile number, e-mail address, etc.). That way, even if an attacker were to gain access to phishing simulation records (e.g., records of the number of phishing simulations an individual falls victim to, which types of phishing simulations an individual falls victim to, a measure of an individual's susceptibility to phishing attacks), the attacker would not be able to utilize such information in a manner that harms the individuals associated with the phishing simulation records.

At the same time, a training program is posed with the conflicting need to associate such phishing simulation records of individuals with those individual's contact information. Upon identifying those individuals most susceptible to phishing attacks, a training program would ideally be able to provide those individuals with targeted and/or additional training materials.

To satisfy both goals of protecting simulation records from being exploited by an attacker and allowing a training program to provide individuals with targeted and/or additional training materials, the inventors propose, in one embodiment of the invention, to associate each phishing simulation record of an individual with an e-mail alias of the individual. Any messages (e.g., simulated attacks, training materials) sent to the e-mail alias would be forwarded to a primary e-mail address of the individual, enabling the proper operation of a training program. Such e-mail alias, however, would be rendered invalid after a certain time period (e.g., after a simulation program has been completed) so that even if an attacker were to gain access to the phishing simulation records, the attacker would not be able to exploit same.

These and further embodiments of the present invention are discussed herein.

BRIEF DESCRIPTION OF THE DRAWINGS

The present invention is illustrated by way of example, and not limitation, in the figures of the accompanying drawings in which.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1:
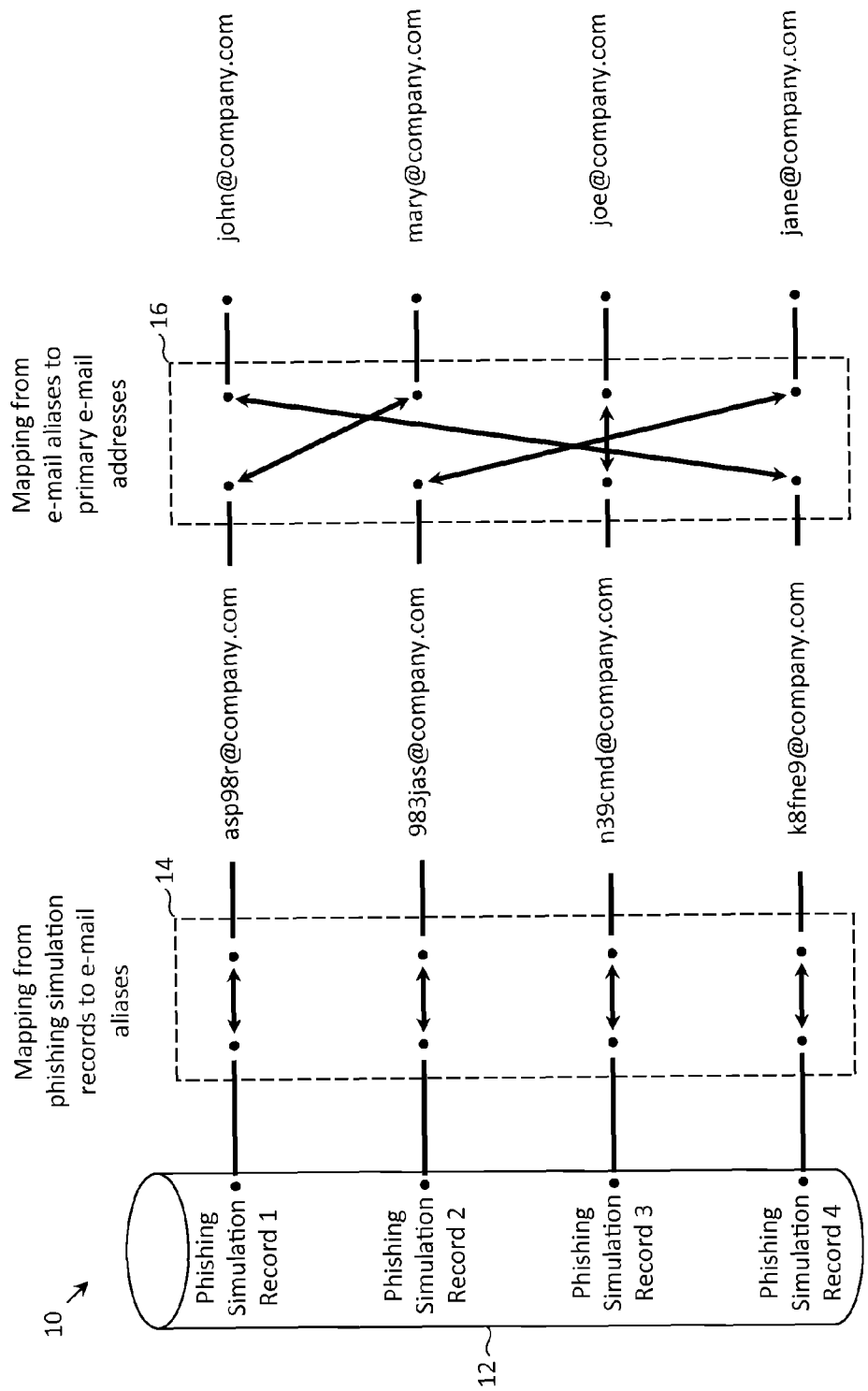
FIG. 1 depicts a schematic illustrating a mapping from phishing simulation records to e-mail aliases and a mapping from e-mail aliases to primary e-mail addresses, according to one embodiment of the invention.

As depicted in schematic 10 of FIG. 1, phishing simulation records 12 may be associated with e-mail aliases (e.g., asp98r <at> company <dot> com, 983jas <at> company <dot> com, etc.) via mapping 14. In the example of FIG. 1, phishing simulation records of four individuals are depicted, and each of the phishing simulation records is associated with an e-mail alias of each of the individuals. While four phishing simulation records are depicted for ease of discussion, any number of phishing simulation records may be present. For example, phishing simulation record 1 is associated with the e-mail alias asp98r <at> company <dot> com. In turn, each of the e-mail aliases is associated with a primary e-mail address via mapping 16. For example, the e-mail alias asp98r <at> company <dot> com is associated with the primary e-mail address mary <at> company <dot> com. It is noted that, in the example provided in FIG. 1, the domain names of the e-mail aliases and the primary e-mail addresses are the same (i.e., both are company <dot> com), but this is not necessarily so. In another example, an e-mail alias could be asp98r <at> company <dot> com, while the primary e-mail address associated with such e-mail alias could be mary <at> gmail <dot> com.

The phrase "primary e-mail address", in embodiments of the invention, refers to a more permanent e-mail address of an individual. This could be a company e-mail address, a personal e-mail address, etc. The primary e-mail address often incorporates one or more of the individual's first name, last name, nickname and other identifier of the individual in the local-part of the e-mail address (i.e., where the "local-part" of an e-mail address is the sequence of characters before the "<at>" symbol), but this is not always so. In practice, a person could have more than one primary e-mail address. For instance, a person could have a gmail address for personal use and a company e-mail address for professional use. Either (or both) of these e-mail address could be considered a primary e-mail address.

An e-mail alias is a forwarding e-mail address (i.e., messages sent to an e-mail alias of an individual are forwarded to the primary e-mail address of the individual). An e-mail alias of an individual may be established after the individual's primary e-mail address has been established, but this is not always so. Other than these functional and/or temporal distinctions, an e-mail alias may be quite similar to a primary e-mail address. Like a primary e-mail address, an e-mail alias may incorporate one or more of the individual's first name, last name, nickname and other identifier of the individual. Like a primary e-mail address, an e-mail alias could be in use for a long period of time.

However, e-mail alias, in accordance with embodiments of the present invention, may be constructed in a more restrictive and/or limited fashion than e-mail aliases currently in use. Typically, an e-mail alias of an individual, in accordance with embodiments of the present invention, does not incorporate any characteristic that may be associated with the identity of the individual (e.g., does not include the individual's first or last name, initials, nickname, birthday, etc.) and/or any other characteristic that could be used by an attacker to determine the identity/contact information of an individual. In practice, the local part of an e-mail alias may include a randomly generated sequence of alpha-numeric characters (e.g., "aa039js"). The local part of an e-mail alias may also include special characters (e.g., !, #, $, etc.) in addition to alphanumeric characters, although there may be restrictions on the use of these special characters. Such details may be found in RFC 5322 and RFC 6531 and will not be discuss in further detail herein. FIG. 1 provides several example e-mail aliases which are suitable for protecting the identity/contact information of an individual. For instance, without the knowledge of mapping 16, there really would be no way for an attacker (or anyone for that matter) to ascertain the primary e-mail address associated with the e-mail alias asp98r <at> company <dot> com.

Typically, an e-mail alias, in accordance with embodiments of the present invention, is active (e.g., able to send/receive messages) for a limited duration of time (e.g., 1 hour, 1 day, etc.). When an e-mail alias is active, any messages sent to the e-mail alias of an individual may be forwarded to the primary e-mail address of the individual. When an e-mail alias is inactive, any messages sent to the e-mail alias may not be forwarded to the associated primary e-mail address.

More particularly, the duration of time that an e-mail alias is active may correspond to the time during which a phishing simulation is being conducted. Before a phishing simulation begins, an e-mail alias may be created for and assigned to an individual. During the phishing simulation, phishing simulations and/or training material may be sent to the individual via the individual's e-mail alias. Any responses from the individual may also be received via the e-mail alias. More specifically, the individual may use his/her primary e-mail address to send a message (e.g., reply to a phishing simulation). Such message may then be forwarded from the primary e-mail address to the e-mail alias, so that the training program receives any response from the individual via his/her e-mail alias rather than via his/her primary e-mail address. Such technique decouples the training program from any primary e-mail addresses of individuals of the training program, precluding any information collected by the training program from being used to mount an attack on the individuals. When the phishing simulation concludes, the e-mail alias may be made inactive.

Figure 2:
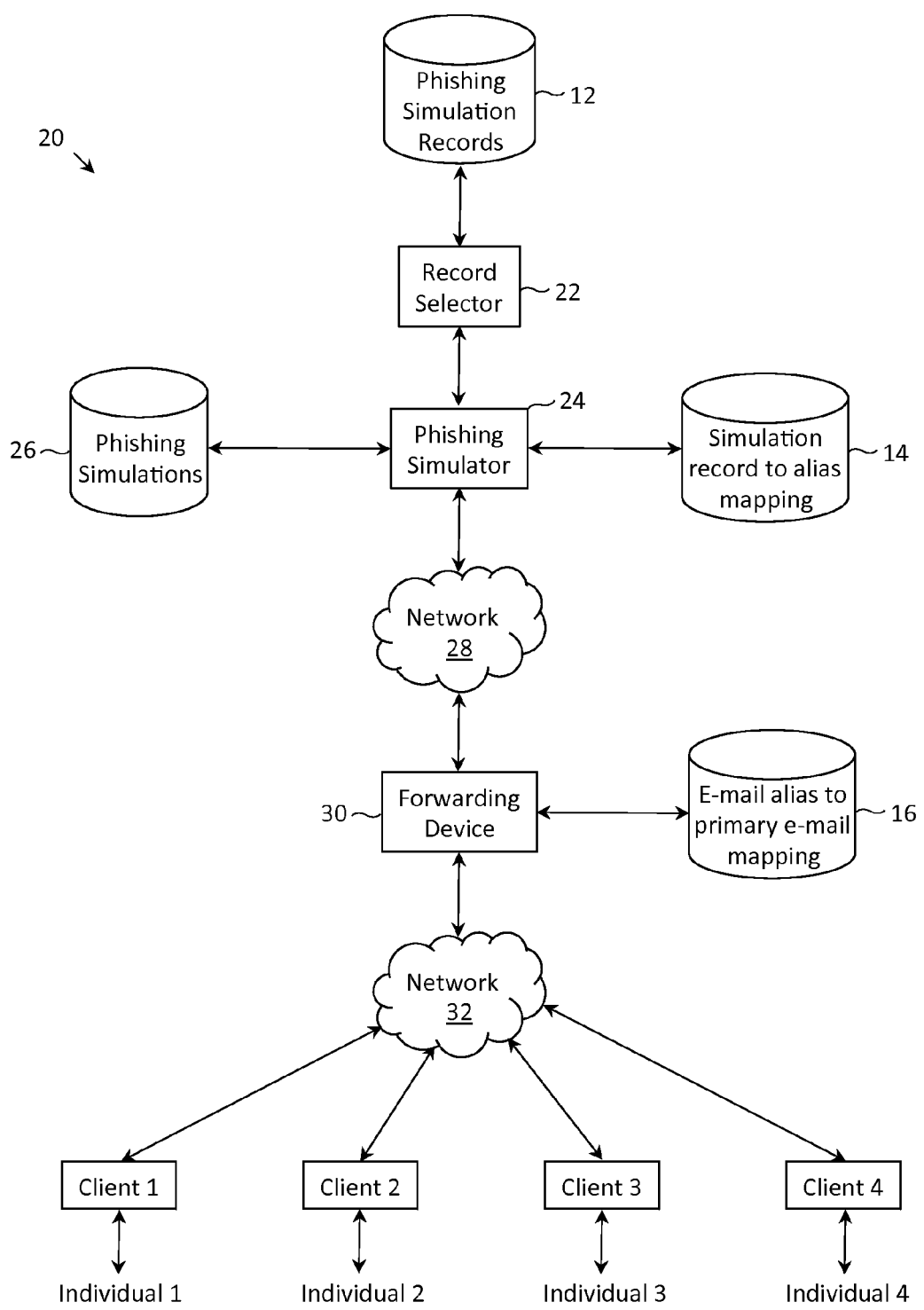
FIG. 2 depicts a system diagram of components used in the administration of phishing simulations to individuals, according to one embodiment of the invention.

FIG. 2 depicts system diagram 20 of components used in the administration of phishing simulations to individuals, according to one embodiment of the invention. Phishing simulation records 12 (of FIG. 2) is a more compact representation of the collection of phishing simulation records 12 (of FIG. 1). More specifically, a phishing simulation record may comprise a measure of an individual's susceptibility to phishing attacks. The measure may include numbers from 1 to 10, with 1 indicating low susceptibility and 10 indicating high susceptibility. Alternatively, the measure may include a percentage from 0% to 100%, with 0% indicating that an individual has fallen victim to none of the phishing simulations and 100% indicating that the individual has fallen victim to all of the phishing simulations. Alternatively and/or in addition, a phishing simulation record may comprise the number of phishing simulations that an individual has fallen victim to. Alternatively and/or in addition, a phishing simulation record may indicate whether an individual has received and/or has reviewed training materials provided by the training program.

Figure 3:
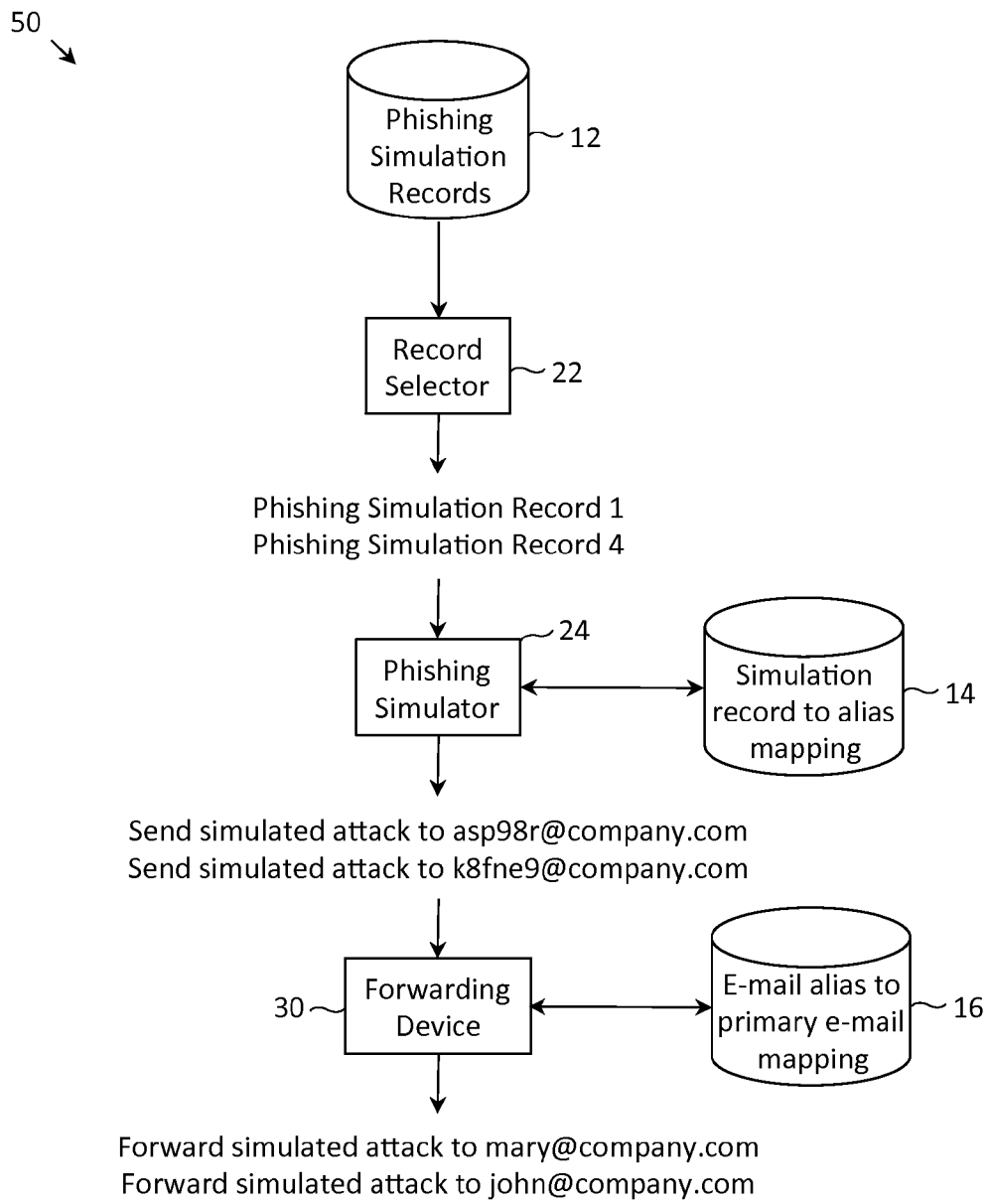
FIG. 3 depicts a specific example of how phishing simulations are administered to individuals via their e-mail aliases, according to one embodiment of the invention.

As depicted in FIG. 2, phishing simulation records 12 may be communicatively coupled to record selector 22. Record selector 22, in one embodiment of the invention, may determine which of the phishing simulation records satisfies a criterion. For example, record selector 22 may determine which of the phishing simulation records has a measure of phishing susceptibility that exceeds a certain threshold. As another example, record selector 22 may determine which of the phishing simulation records contain a record of individuals falling victim to more than ten phishing simulations. Record selector 22 may then select at least one of the phishing simulation records that satisfies the criterion. In one instance, record selector 22 may select all of the phishing simulation records that satisfy the criterion. As a specific example, record selector 22 may select "Phishing Simulation Record 1" and "Phishing Simulation Record 4", as depicted in process 50 of FIG. 3.

As depicted in FIG. 2, record selector 22 may be communicatively coupled to phishing simulator 24. Based on information provided by record selector 22, phishing simulator 24 may be instructed to provide phishing simulations and/or training materials to individuals associated with certain phishing simulation records. Phishing simulator 24 may retrieve specific phishing simulations and/or training materials from phishing simulation data store 26, those simulations and/or materials retrieved being properly matched to an individual associated with a selected phishing simulation record. For example, based on information from a phishing simulation record that an individual consistently fails to recognize phishing simulations with personalized salutations, phishing simulator 24 may provide that individual with training materials designed to increase his/her awareness of phishing simulations with personalized salutations.

Phishing simulator 24 may access data store 14 which stores a mapping from phishing simulation records to e-mail aliases in order to determine an e-mail address through which an individual associated with a phishing simulation record can be contacted. As a specific example, phishing simulator 24 may access data store 14 to determine that e-mail alias asp98r <at> company <dot> com is associated with phishing simulation record 1, and e-mail alias k8fne9<at> company <dot> com is associated with phishing simulation record 4. Based on information from record selector 22, phishing simulation data store 26 and simulation record to alias mapping data store 14, phishing simulator 24 may send messages (e.g., phishing simulations and/or training materials) to certain e-mail aliases via network 28. Continuing with the specific example provided in FIG. 3, phishing simulator 24 may send a simulated attack to asp98r <at> company <dot> com and a simulated attack to k8fne9<at> company <dot> com.

Subsequently, forwarding device 30 may detect that one or more messages have been sent to an individual's e-mail alias. Relying upon a mapping from e-mail aliases to primary e-mail addresses provided in data store 16, forwarding device 30 may forward the one or more messages to a primary e-mail address of the individual. More specifically, the one or more messages may be forwarded to an e-mail inbox of the individual, as identified by the primary e-mail address of the individual, via network 32 and the individual's client machine. Returning to the specific sample of FIG. 3, a simulated attack sent to asp98r <at> company <dot> com may be forwarded to mary <at> company <dot> com, and a simulated attack sent to k8fne9<at> company <dot> com may be forwarded to john <at> company <dot> com, in accordance with the mapping provided in data store 16.

After phishing simulations have concluded (or after a certain time duration has elapsed from the instant the e-mail aliases were created), one or more of the e-mail aliases may become invalid, preventing those individuals whose e-mail aliases have become invalid (or deactivated) from receiving any further messages from their respective e-mail aliases while their respective e-mail aliases are invalid. An e-mail alias may be rendered invalid by removing certain associations from the mapping provided in data store 16. For instance, to render the e-mail alias asp98r <at> company <dot> com invalid, one may remove the association between asp98r <at> company <dot> com and mary <at> company <dot> com. Alternatively, such association from e-mail alias to primary e-mail address could be preserved in data store 16, but forwarding device 30 could be instructed to (temporarily) stop forwarding any messages from asp98r <at> company <dot> com to mary <at> company <dot> com. Indeed, e-mail aliases need not be permanently deactivated. Instead, they could be deactivated at the end of one phishing simulation and reactivated during a subsequent phishing simulation.

As discussed above, a primary reason for using e-mail aliases and rendering them inactive after a certain period of time is to thwart an attacker's attempt to exploit phishing simulation records (in the event that the attacker gains access to same). In accordance with techniques of one embodiment of the invention, even if the attacker has knowledge that an individual is highly susceptible to phishing attacks, such knowledge is of little use if the attacker has no way of contacting the individual (e.g., the attacker could attempt to send a phishing attack to an e-mail alias, but such attack would fail to reach the intended individual in the event that the e-mail alias has been rendered inactive).

An underlying assumption in FIG. 2 is that data store 14 is separate from data store 16 such that even if an attacker were to gain access to data store 14, the attacker does not automatically also gain access to data store 16. In one embodiment of the invention, data store 14 may be physically separated from data store 16 (e.g., data store 14 and data store 16 may be separate devices and/or may be separated by network 28).

In a variation of FIG. 2, phishing simulator 24 may be directly coupled to forwarding device 30 (i.e., network 28 is not present). In such embodiment, the mapping present in data store 14 and the mapping present in data store 16 may be stored in a common data storage device. To thwart an attacker from gaining knowledge of the association between phishing simulation records and primary e-mail addresses (and subsequently attacking individuals who participate in the training program), the mapping from e-mail aliases to primary e-mail addresses may be stored in an encrypted manner. As such, even if in attacker were to gain access to the phishing simulation records, the attacker will be unable to contact individuals associated with the phishing simulation records (assuming that the e-mail aliases have been rendered invalid).

In the discussion above, references have been made to a "training program". Such "training program" may include one or more of the components of FIG. 2: phishing simulation records 12, record selector 22, phishing simulator 24, phishing simulations 26 and simulation record to alias mapping 14. Forwarding device 30 and e-mail alias to primary e-mail mapping 16 may be present in a mail server which is coupled to the training program via network 28.

Figure 4:
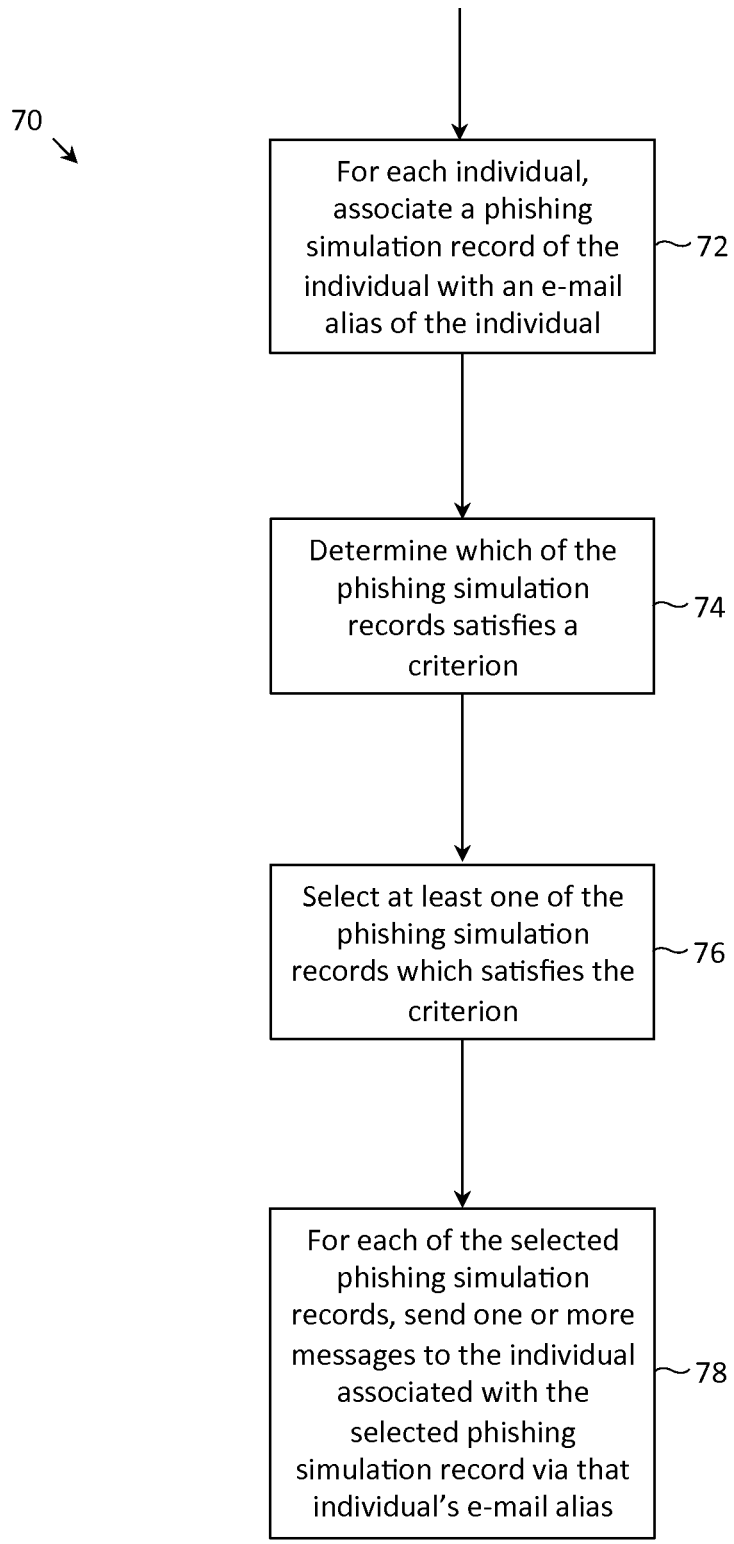
FIG. 4 depicts a flow diagram of a process to administer phishing simulations to individuals via their e-mail aliases, according to one embodiment of the invention.

FIG. 4 depicts flow diagram 70 of a process to administer phishing simulations to individuals via e-mail aliases, according to one embodiment of the invention. At step 72, for each individual, a phishing simulation record of the individual may be associated with an e-mail alias of the individual. Such association may be recorded in data store 14, as described above. At step 74, record selector 22 may determine which of the phishing simulation records satisfies a criterion. At step 76, record selector 22 may select at least one of the phishing simulation records which satisfies the criterion. Finally, at step 78, phishing simulator 24 may, for each of the selected phishing simulation records, send one or more messages to the individual associated with the selected phishing simulation record via that individual's e-mail alias.

While embodiments of the present invention have been described in the context of preventing an attacker from maliciously using phishing simulation records, there may be other contexts for which decoupling a phishing simulation record from an individual's personal/contact information using an e-mail alias would be beneficial. For instance, privacy laws or a company's Chief Privacy Officer may want to preclude phishing susceptibility attribution. That is, a company's objective is typically to reduce its employees' susceptibility to phishing attacks, and not necessarily to specifically know who is most susceptible.

Figure 5:
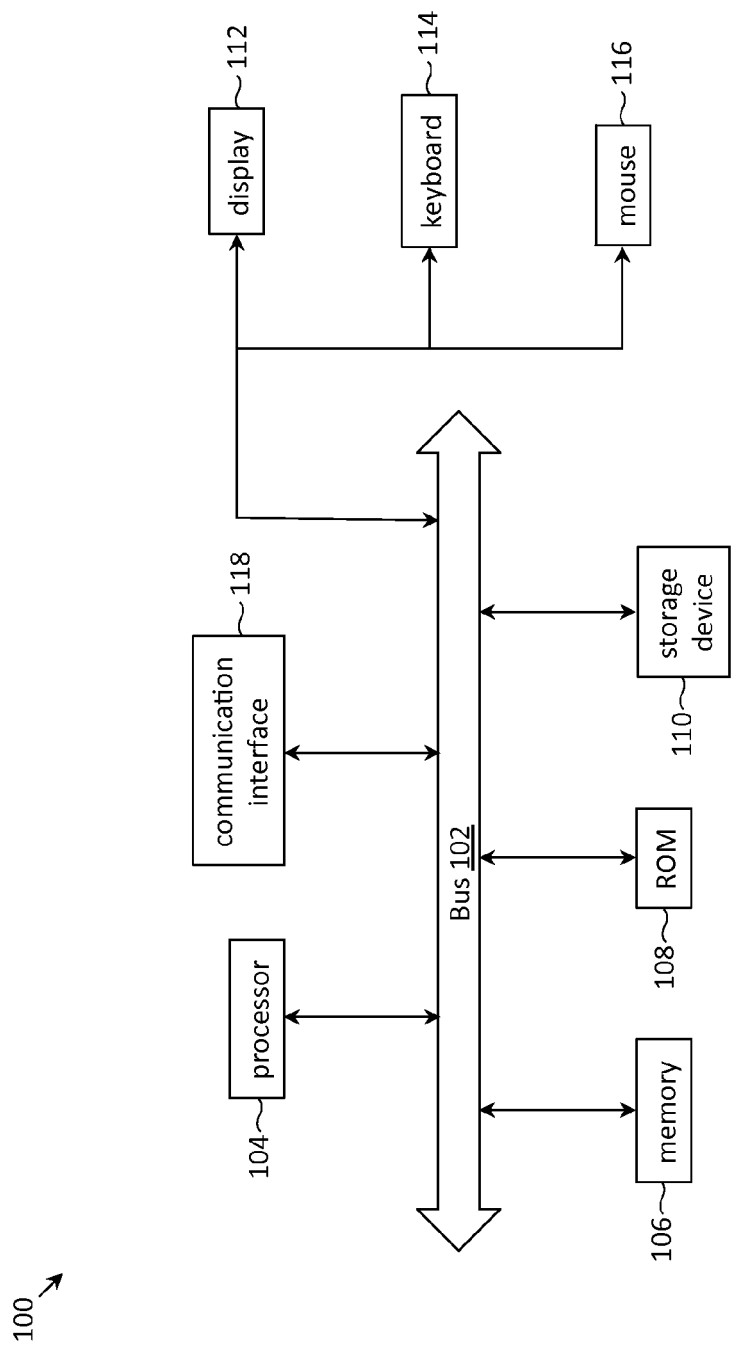
FIG. 5 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 5 provides an example of computer system 100 that is representative of any of the client/server devices discussed herein. Further, computer system 100 is representative of a device that performs the process depicted in FIG. 4. Note, not all of the various devices discussed herein may have all of the features of computer system 100. For example, certain devices discussed above may not include a display inasmuch as the display function may be provided by a client computer communicatively coupled to computer system 100 or a display function may be unnecessary. Such details are not critical to the present invention.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, which may be one or more of a floppy disk, a flexible disk, a hard disk, flash memory-based storage medium, magnetic tape or other magnetic storage medium, a compact disk (CD)-ROM, a digital versatile disk (DVD)-ROM, or other optical storage medium, or any other storage medium from which processor 104 can read, is provided and coupled to the bus 102 for storing information and instructions (e.g., operating systems, applications programs and the like).

Computer system 100 may be coupled via the bus 102 to a display 112, such as a flat panel display, for displaying information to a computer user. An input device 114, such as a keyboard including alphanumeric and other keys, is coupled to the bus 102 for communicating information and command selections to the processor 104. Another type of user input device is cursor control device 116, such as a mouse, a trackball, or cursor direction keys for communicating direction information and command selections to processor 104 and for controlling cursor movement on the display 112. Other user interface devices, such as microphones, speakers, etc. are not shown in detail but may be involved with the receipt of user input and/or presentation of output.

The processes referred to herein may be implemented by processor 104 executing appropriate sequences of computer-readable instructions contained in main memory 106. Such instructions may be read into main memory 106 from another computer-readable medium, such as storage device 110, and execution of the sequences of instructions contained in the main memory 106 causes the processor 104 to perform the associated actions. In alternative embodiments, hard-wired circuitry or firmware-controlled processing units (e.g., field programmable gate arrays) may be used in place of or in combination with processor 104 and its associated computer software instructions to implement the invention. The computer-readable instructions may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 100 or similar electronic computing device, that manipulates and transforms data represented as physical (electronic) quantities within its registers and memories into other data similarly represented as physical quantities within its memories or registers or other such information storage, transmission or display devices.

Computer system 100 also includes a communication interface 118 coupled to the bus 102. Communication interface 118 provides a two-way data communication channel with a computer network, which provides connectivity to and among the various computer systems discussed above. For example, communication interface 118 may be a local area network (LAN) card to provide a data communication connection to a compatible LAN, which itself is communicatively coupled to the Internet through one or more Internet service provider networks. The precise details of such communication paths are not critical to the present invention. What is important is that computer system 100 can send and receive messages and data through the communication interface 118 and in that way communicate with hosts accessible via the Internet.

Thus, methods, network devices and machine-readable media for preventing malicious use of phishing simulation records have been described. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer-implemented method performed by a data processing apparatus, the method comprising:
   for an individual, associating a phishing simulation record of the individual with an e-mail alias of the individual and associating the e-mail alias of the individual with a primary e-mail address of the individual;
   sending via a computer network one or more simulated phishing messages to the individual via the e-mail alias associated with the individual;
   generating a phishing simulation record based on a response by the individual to the one or more simulated phishing messages,
   wherein, for the individual, the phishing simulation record of the individual is associated with the primary e-mail address of the individual only through the e-mail alias of the individual;
   wherein, after sending the one or more messages, disassociating by a computer processor the primary e-mail address of the individual from the e-mail alias of the individual such that phishing susceptibility attribution is precluded for the individual.

2. The method of claim 1, wherein the phishing simulation record comprises a measure of the corresponding individual's susceptibility to phishing attacks.

3. The method of claim 1, further comprising determining which of the phishing simulation records has a measure of phishing susceptibility that exceeds a threshold.

4. The method of claim 1, wherein the phishing simulation record comprises a total number of phishing simulations that the corresponding individual has fallen victim to.

5. The method of claim 4, wherein if the total number of phishing simulations that the corresponding individual has fallen victim to exceeds a threshold, then sending via the computer network one or more simulated phishing messages to the individual.

6. The method of claim 1, wherein the association between the e-mail aliases and the primary e-mail addresses is stored using encryption.

7. The method of claim 1, wherein the association between the phishing simulation records and the e-mail aliases is stored in a first data store and the association between the e-mail aliases and the primary e-mail addresses is stored in a second data store, the first data store being separate from the second data store so that even if an attacker gains access to the first data store, the attacker does not automatically gain access to the second data store.

8. The method of claim 1, further comprising:
upon detecting that one or more messages have been sent to an individual's e-mail alias, forwarding the one or more messages to the primary e-mail address of the individual.

9. The method of claim 1, wherein the one or more messages comprise one or more of phishing simulations and training materials constructed to increase an individual's awareness of phishing attacks.

10. A network device, comprising:
a processor;
a storage device connected to the processor; and
a set of instructions on the storage device that, when executed by the processor, cause the processor to:
for an individual, associate a phishing simulation record of the individual with an e-mail alias of the individual and associate the e-mail alias of the individual with a primary e-mail address of the individual;
sending one or more simulated phishing messages to the individual via the e-mail alias associated with the individual;
generating a phishing simulation record based on a response by the individual to the one or more simulated phishing messages,
wherein, for the individual, the phishing simulation record of the individual is associated with the primary e-mail address of the individual only through the e-mail alias of the individual;
wherein, after sending the one or more messages, disassociating by a computer processor the primary e-mail address of the individual from the e-mail alias of the individual such that phishing susceptibility attribution is precluded for the individual.

11. A non-transitory machine-readable storage medium comprising software instructions that, when executed by a processor, cause the processor to:
for an individual, associate a phishing simulation record of the individual with an e-mail alias of the individual and associate the e-mail alias of the individual with a primary e-mail address of the individual;
sending one or more simulated phishing messages to the individual via the e-mail alias associated with the individual;
generating a phishing simulation record based on a response by the individual to the one or more simulated phishing messages,
wherein, for the individual, the phishing simulation record of the individual is associated with the primary e-mail address of the individual only through the e-mail alias of the individual;
wherein, after sending the one or more messages, disassociating by a computer processor the primary e-mail address of the individual from the e-mail alias of the individual such that phishing susceptibility attribution is precluded for the individual.

12. The method of claim 10, the instructions further comprising instructions for determining which of the phishing simulation records has a measure of phishing susceptibility that exceeds a threshold.

13. The method of claim 10, wherein the phishing simulation record comprises a total number of phishing simulations that the corresponding individual has fallen victim to.

14. The method of claim 10, wherein if the total number of phishing simulations that the corresponding individual has fallen victim to exceeds a threshold, then sending via the computer network one or more simulated phishing messages to the individual.

15. The non-transitory machine-readable storage medium of claim 11, the instructions further comprising instructions for determining which of the phishing simulation records has a measure of phishing susceptibility that exceeds a threshold.

16. The non-transitory machine-readable storage medium of claim 11, wherein the phishing simulation record comprises a total number of phishing simulations that the corresponding individual has fallen victim to.

17. The non-transitory machine-readable storage medium of claim 11, wherein if the total number of phishing simulations that the corresponding individual has fallen victim to exceeds a threshold, then sending via the computer network one or more simulated phishing messages to the individual.

* * * * *